United States Patent [19]

Meyer et al.

[11] Patent Number: 5,112,065

[45] Date of Patent: May 12, 1992

[54] DOUBLE DIRECTIONAL GASKET

[75] Inventors: Jeffry R. Meyer, Penn Hills Township, Allegheny County; Richard P. Kole, Murrysville, both of Pa.

[73] Assignee: Westinghouse Electric Corp., Pittsburgh, Pa.

[21] Appl. No.: 669,261

[22] Filed: Mar. 14, 1991

[51] Int. Cl.⁵ .......................... B60J 10/08; F16J 15/02
[52] U.S. Cl. .............................. 277/167.5; 277/200; 277/186; 277/189; 277/27; 220/378; 220/240; 49/483
[58] Field of Search ............... 277/167.5, 200, 212 R, 277/186, 189, 152, 9 J, 3, 27; 220/378, 240; 49/483, 495

[56] References Cited

U.S. PATENT DOCUMENTS

| | | | |
|---|---|---|---|
| 2,528,264 | 10/1951 | Coppock et al. | 49/489 |
| 2,782,887 | 2/1957 | Zimmermann | 49/489 |
| 2,818,993 | 1/1958 | Alt | 220/378 |
| 3,427,034 | 2/1969 | Lowe | 277/200 |
| 3,554,567 | 1/1971 | Carroll et al. | 277/200 X |
| 3,656,260 | 4/1972 | Weaver et al. | 49/489 |
| 4,452,462 | 6/1984 | Karr, Jr. | 277/167.5 X |
| 4,854,600 | 8/1989 | Halling et al. | 277/200 X |
| 5,009,036 | 4/1991 | Ryan | 49/489 X |

FOREIGN PATENT DOCUMENTS

| | | | |
|---|---|---|---|
| 0608092 | 11/1960 | Canada | 49/493 |
| 0693389 | 9/1964 | Canada | 285/336 |
| 1033883 | 4/1956 | Fed. Rep. of Germany | 49/489 |
| 2002980 | 7/1971 | Fed. Rep. of Germany | 49/489 |
| 2702245 | 7/1978 | Fed. Rep. of Germany | 49/489 |
| 2825303 | 12/1979 | Fed. Rep. of Germany | 49/489 |
| 0944434 | 4/1949 | France | 277/189 |
| 7401081 | 8/1975 | France | 49/489 |
| 0575060 | 3/1958 | Italy | 49/489 |
| 0056254 | 5/1977 | Japan | 277/200 |
| 0056255 | 5/1977 | Japan | 277/200 |
| 0097776 | 1/1961 | Norway | 49/495 |

Primary Examiner—William A. Cuchlinski, Jr.
Assistant Examiner—James K. Folker

[57] ABSTRACT

A double directional gasket which, when contained within a partial enclosure, forms a double directional seal under low sealing forces due to the toggle like action of the relatively thin central portion of the gasket loading the seating area generally 90 degrees to the pressure loading on the relatively thin central portion.

7 Claims, 2 Drawing Sheets

DOUBLE DIRECTIONAL GASKET

GOVERNMENT CONTRACT

This invention was conceived or first reduced to practice in the course of, or under Contract No. N00024-86-C-4030 between Westinghouse Electric Corporation and the United States Government, represented by the Department of the Navy.

CROSS REFERENCE TO RELATED APPLICATIONS

This application is related to co-pending applications entitled A Dogging Mechanism, Ser. No. 07/669541 and A Water Tight Door, Ser. No. 07/669258 both filed on the same day as this application.

BACKGROUND OF THE INVENTION

The invention relates to a gasket and more particularly to a gasket that is confined in a partial enclosure and maintains its seal when either side is subjected to higher pressure.

Seals on many of the hatches, scuttles and bulkhead doors on ships use flat gaskets and knife edges to effectuate a seal and require very high sealing forces to produce a seal. These seals are very sensitive to warpage and knife edge damage, which causes them to leak.

SUMMARY OF THE INVENTION

Among the objects of the invention may be noted the provision of a seal which requires small initial sealing force, does not require fine finished machined surfaces or knife edges and will accommodate a considerable amount of warpage.

In general, a double directional gasket for forming a fluid tight seal between a first member having a groove about its periphery and a second member having an L shaped portion about its periphery, when made in accordance with this invention, comprises a gasket having two extensive margins, one of the margins having a thick portion adjacent thereto, which is configured to form a seal and be captured within the groove. The other margin is tapered to a small radius and disposed to seat adjacent the corner of the L shaped portion. A strip like portion extends at a angle from the thick portion to the tapered portion and toward the corner of said L shaped portion, when the seal is being formed. The grooved portion has an extension, which cooperates with the L shaped portion to form a peripheral partial enclosure in which the cross section of the strip portion of the gasket forms a general S shape, to produce a fluid tight seal irrespective of the side of the gasket subjected to high pressure.

BRIEF DESCRIPTION OF THE DRAWINGS

The invention as set forth in the claims will become more apparent by reading the following detailed description in conjunction with the accompanying drawings, wherein like reference numerals refer to like parts throughout the drawings and in which:

DESCRIPTION OF THE PREFERRED EMBODIMENT

Figure 4:
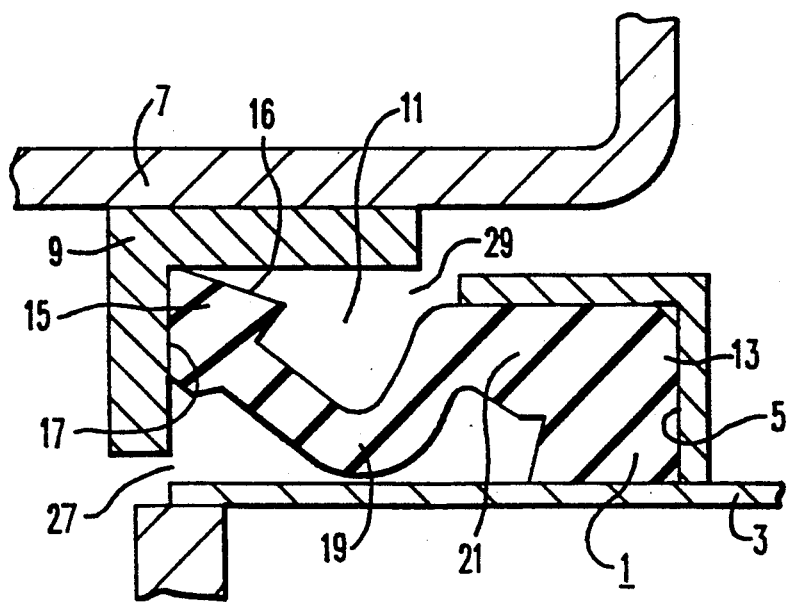
FIG. 4 is an enlarged sectional view of the gasket in a partial enclosure forming a seal.

Referring now to the drawings in detail and in particular to FIG. 4, there is shown a double directional gasket 1 used to form a fluid seal between a first structure 3 having a groove 5 disposed adjacent its periphery, the groove having an extended wall 6, and a second structure 7 having an L shaped portion 9 disposed adjacent its periphery, which cooperates with the groove 5 and extend wall portion 6 to form a partial enclosure 11 having a generally rectangular cross section.

Figure 1:
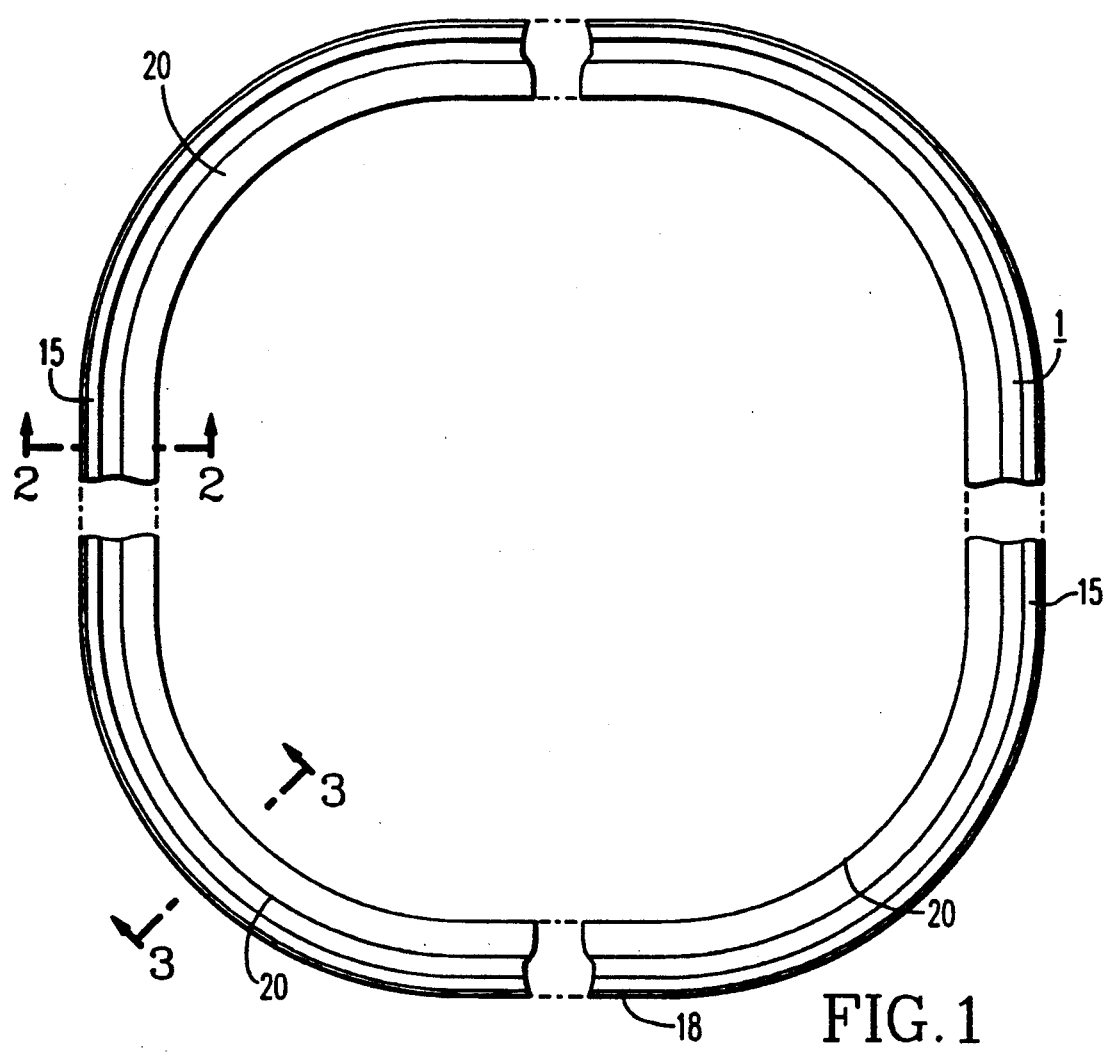
FIG. 1 is a plan view of a gasket made in accordance with this invention.
Figure 2:
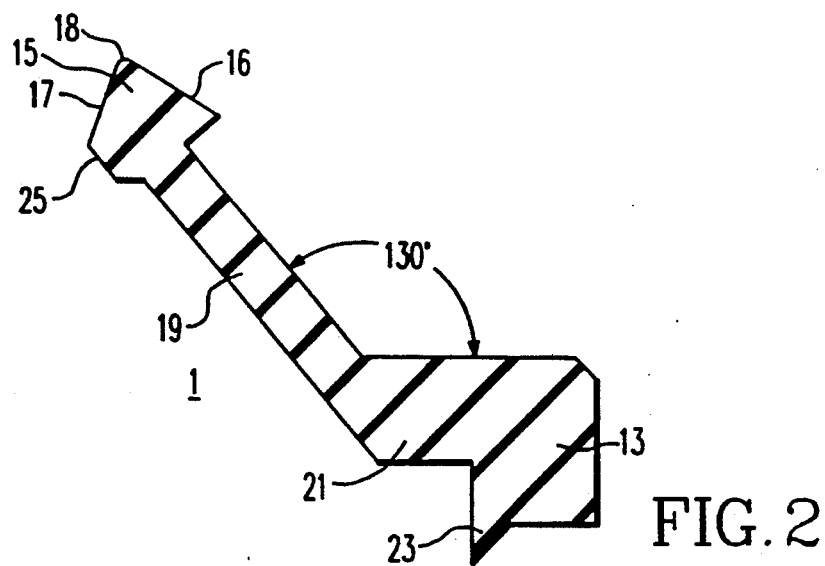
FIG. 2 is an enlarged sectional view of the gasket taken on line 2—2 of FIG. 1.
Figure 3:
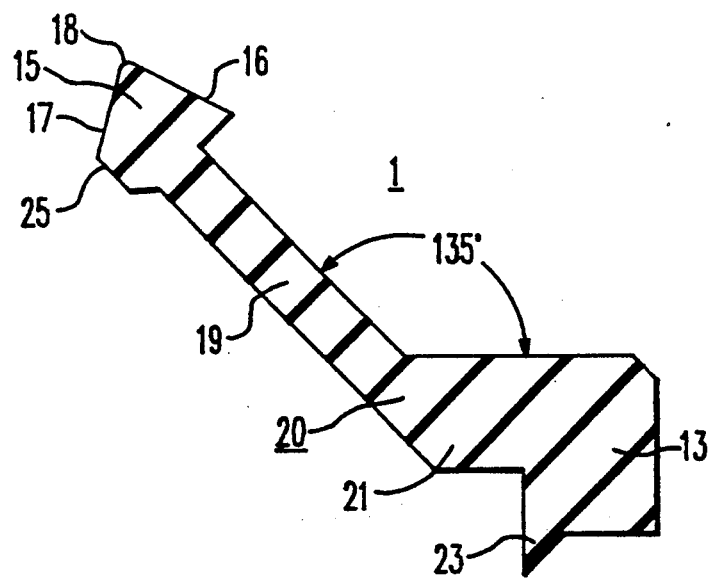
FIG. 3 is an enlarged sectional view of the gasket taken on line 3—3 of FIG. 1.

The gasket 1, as shown in FIGS. 1, 2 and 3 comprises a continuous band having a pair of extensive margins. One of the margins has a thick portion 13 with a generally rectangular cross section adjacent thereto. The other margin has a cross section shaped generally like an arrowhead, this arrowhead shaped portion 15 has a pair of converging generally flat surfaces 16 and 17, which blend into an arcuate portion having a relatively small radius forming a tip 18. A strip portion 19 is disposed to extend between the thick portion 13 and arrowhead shaped portion 15 at an included angle of about 130° from the top surface of the thick portion 19 in the straight portions. Arcuate portions 20 of the gasket 1 generally have an included angle of 135°. These angles cooperate with the disposition of the enclosure portions to provide the proper contact between the tip 18 and a leg of the L shaped portion 9. Large hatches on commercial ships, which are opened and closed using a crane rather than being hinged, may require different angles and larger L shaped portions.

The thick portion 13 has an intermediate portion 21, which is not as thick as the portion adjacent the margin. The intermediate portion 21 is disposed adjacent the strip portion 19. The thick portion 13 also has a wedge shaped portion 23 forming the corner adjacent the intermediate portion 21. The thick portion 13 is slightly smaller than the opening in the groove portion 5 allowing the thick portion 13 to be inserted into the groove 5 when a reasonable insertion force is applied up to the point where the wedge shaped corner 23 contacts the groove 5, at which time additional insertion force must be applied to deform the wedge shaped corner 23. The additional force deforms the wedge shaped corner 23 until the thick portion 13 is seated in the groove 5. This deformation of the wedge shaped portion 23 forms a tight seal within the groove 5 and acts to trap the thick portion 13 in the groove 5. The intermediate portion 21 provides space for the deformation of the wedge shaped corner 23.

The angular orientation of the arrowhead portion 15 created by the strip portion 19 cooperates with the disposition of the L shaped portion 9 so that the tip 18 contacts the leg of the L shaped portion, which extends toward the thick portion 13, slides toward the corner formed by the juncture of the legs of the L shaped portion 9 and becomes trapped at the corner of the L shaped portion 9 as the structures 3 and 7 continue to move toward each other. The off center disposition of the tip 18 initiates bending of the strip portion 19 and cooperates with the intermediate portion 21 to cause the strip portion 19 to buckle and the flat surface 17 of the arrowhead portion 15 to seat on the other leg portion of L shaped portion 9, when the groove portion 5 and L shaped portion 9 form the partial enclosure 11 under the continuing application of a minimal closing force. The S shaped cross section of the strip portion 19 formed by the buckling produces a loading on the seating area generally 90° to the pressure loading on the strip portion 19. This loading tends to cancel a similar load applied by the gasket on the opposite side of the closure 11 so that the net force applied by the seal 1 is minimal. The S shaped strip portion 19 will react to pressure from either side to tighten the seal and find a good seat, even if some of the surface of the L shaped portion 9 is damaged. Increased pressure will create a tighter contact pressure between either of the flat surfaces 16 and 17 and the L shaped portion 9, depending on the direction in which the pressure is acting, thereby increasing the sealing action.

The enclosure 11 has a small gap 27 disposed between the L shaped portion 9 and the first structure 3. The gap 27 is smaller than the thickness of the arrowhead portion 15 so that when pressure is applied from the second structure 7 side of the enclosure and builds up to a certain level the arrowhead portion 15 moves across the gap 27 maintaining the seal and continues to do as the pressure continues to increase to a level where the gasket fails due to tearing of the elastomer gasket material.

The enclosure also has a small gap 29 between the portion defining the groove 5, the L shaped portion 9 and the second structure 7. When pressure is applied from the first structure 3 side and reaches a certain level, the pressure attempts to push the strip portion 13 through the gap 29, to do so the strip portion must fold and the folded strip portion is larger than the gap 29 so that under increased pressure the seal is maintained as the sealing action increases until the gasket fails due to tearing of the elastomer gasket material.

The gasket 1 advantageously provides improved sealing characteristics, reduced loading force to form a seal and is more tolerant to seal surface irregularities than traditional O-rings and flat gaskets. The toggle like action allows the gasket to seal even when the structures 3 and 7 are warped.

While the preferred embodiments described herein set forth the best mode to practice this invention presently contemplated by the inventors, numerous modifications and adaptations of this invention will be apparent to others skilled in the art. Therefore, the embodiments are to be considered as illustrative and exemplary and it is understood that the claims are intended to cover such modifications and adaptations as they are considered to be within the spirit and scope of this invention.

What is claimed is:

1. A double directional elastomer gasket for forming a fluid tight seal between a first member having a groove about its periphery and a second member having an L shaped portion about its periphery when the members are brought together by a force sufficient to seal the gasket, said gasket having two extensive margins, one of said margins having a thick portion adjacent thereto, which is configured to form a seal and be captured within said groove; said other margin being arrowhead shaped with a tip portion tapered to a radius and disposed to seat adjacent a corner of said L shaped portion and a straight strip like portion extending at an angle from said thick portion to said arrowhead shaped portion and toward the corner of said L shaped portion, when the seal is being formed; said groove having an extension on one side thereof, which cooperates with the L shaped portion to form a peripheral partial enclosure in which the straight strip like portion buckles whereby the cross section of the strip portion of the gasket forms a general S shape when the seal is formed, to produce a fluid tight seal irrespective of the side of the gasket subjected to high pressure.

2. The double directional elastomer gasket of claim 1, wherein the radius at the tip of the arrowhead is generally in line with an outer side of the strip like portion defining an original point of contact between the L shaped portion and the gasket which is off center from said corner to initiate the buckling of the strip like portion and the forming of the S shape to minimize the force required to seat the gasket.

3. The double directional gasket of claim 1, wherein the thick portion has a wedge shaped edge portion, which cooperates with the groove to trap the thick portion in the groove and forms a fluid tight seal within the groove.

4. The double directional gasket of claim 1, wherein the gasket is a continuous band.

5. The double directional gasket of claim 4, wherein the continuous band is formed with arcuate portions and straight portions and an included angle between the thick portion and the strip like portion is greater in the arcuate portions than in the straight portions when the gasket is free standing.

6. The double directional gasket of claim 3, wherein there is an intermediate portion between the thick portion and the strip like portion, the intermediate portion being not as thick as the thick portion to provide room for the wedge shaped edge and reducing the force required to seat the gasket.

7. The double directional gasket of claim 1, wherein the partial enclosure has a generally rectangular shaped cross section.

* * * * *